No. 618,982. Patented Feb. 7, 1899.
W. C. DAVIS.
CAR AXLE.
(Application filed Oct. 24, 1898.)

(No Model.)

Attest
F. L. Middleton
C. S. Middleton

Inventor
Wm. C. Davis
by Elli Spear
Atty.

THE NORRIS PETERS CO., PHOTO-LITHO., WASHINGTON, D. C.

UNITED STATES PATENT OFFICE.

WILLIAM C. DAVIS, OF DENVER, COLORADO.

CAR-AXLE.

SPECIFICATION forming part of Letters Patent No. 618,982, dated February 7, 1899.

Application filed October 24, 1898. Serial No. 694,433. (No model.)

*To all whom it may concern:*

Be it known that I, WILLIAM C. DAVIS, a citizen of the United States, residing at Denver, Arapahoe county, State of Colorado, have invented certain new and useful Improvements in Car-Axles, of which the following is a specification.

My invention relates to car-axles of that class in which the axles are divided into two sections, so as to be readily capable of being removed and renewed when this becomes necessary.

It is the object of the present invention to provide a simple construction which will enable me to use axles which are perfectly plain, without a groove, and I attain this object by a simple connection between the hub of the wheel and the incasing sleeve, which is readily removable, but which renders unnecessary the grooving of the axle, as has been done heretofore.

Figure 1:
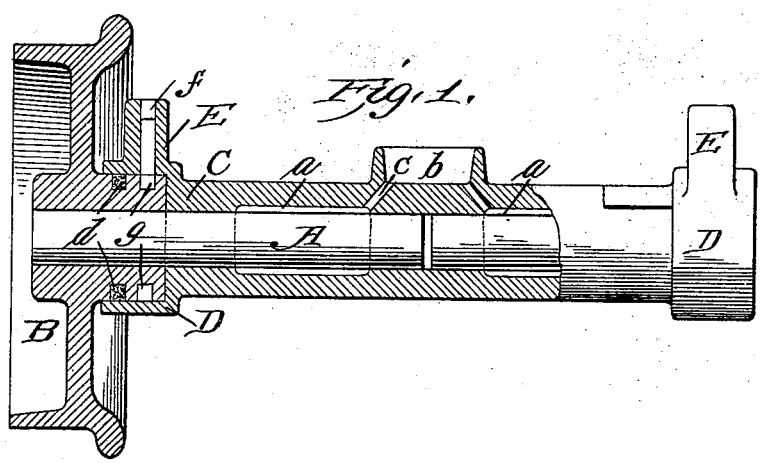
Figure 2:
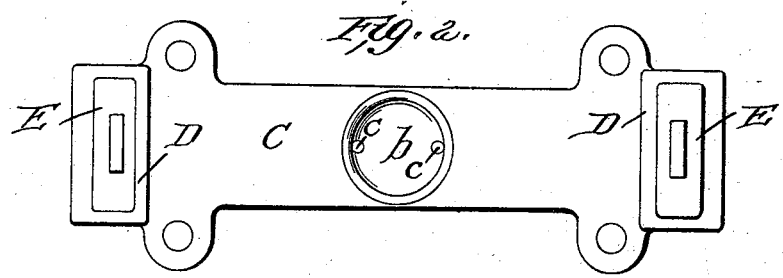
Figure 3:
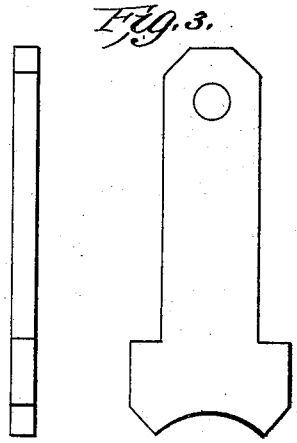

In the drawings, Figure 1 is a sectional view showing the divided axle with the inclosed sleeve and the wheel at one end. Fig. 2 is a plan view of the inclosing sleeve, and Fig. 3 is a detail of the retaining-yoke.

In Fig. 1 the axle is shown at A and the wheel at B. They are secured together in any suitable manner. The axle is made perfectly plain, without grooves, and the parts of the axle are inclosed within a sleeve C. This sleeve has recesses at either side of the center, as at $a$, and these recesses are in connection with an oil-cup $b$, with openings $c$ to the recesses, so as to supply a proper amount of lubricant to the axles. The wheel is formed with an elongated hub and has two annular recesses, the first, $d$, provided with a packing or filling which is intended to prevent the discharge of oil between the hub and the sleeve. The sleeve has an enlargement D encircling the elongated hub, (shown in Fig. 1,) and extending from this enlargement is a projection E, which is provided with a socket $f$. This socket is in direct line with a groove $g$, formed in the hub. A retaining-yoke (shown in Fig. 3) is fitted to the socket in the projection, and its curved lower end fits the annular groove $g$ in the hub and serves to retain the wheel and axle in place in the sleeve; but when it is desired to remove the wheel and axle the retaining-yoke is readily lifted for this purpose.

What I claim is—

1. In combination with a divided axle, a sleeve snugly fitting said axle at the line of division and near the ends, and having recesses between said snugly-fitting portions, an oil-cup carried by the sleeve at the line of division, and diagonal passages leading from the oil-cup to the recesses, substantially as described.

2. In combination with a divided axle, a wheel secured thereto, said wheel having an elongated hub, a peripheral groove formed in said hub, a sleeve inclosing the axle and a part of the hub, a projection rising from said sleeve having a socket in line with the peripheral groove and a retaining-yoke snugly fitting the socket and engaging the peripheral groove, substantially as described.

In testimony whereof I affix my signature in presence of two witnesses.

WILLIAM C. DAVIS.

Witnesses:
F. M. DAVIS,
J. M. BLYTHE.